US011728981B2

United States Patent
Balmakhtar et al.

(10) Patent No.: US 11,728,981 B2
(45) Date of Patent: *Aug. 15, 2023

(54) QUANTUM AUTHENTICATION IN WIRELESS COMMUNICATION NETWORKS

(71) Applicant: T-MOBILE INNOVATIONS LLC, Overland Park, KS (US)

(72) Inventors: Marouane Balmakhtar, Fairfax, VA (US); Lyle Walter Paczkowski, Mission Hills, KS (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/893,875

(22) Filed: Aug. 23, 2022

(65) Prior Publication Data
US 2022/0400002 A1   Dec. 15, 2022

Related U.S. Application Data

(63) Continuation of application No. 17/325,857, filed on May 20, 2021, now Pat. No. 11,469,889.

(51) Int. Cl.
*H04L 29/06* (2006.01)
*H04L 9/08* (2006.01)
*H04W 12/06* (2021.01)

(52) U.S. Cl.
CPC ............ *H04L 9/0858* (2013.01); *H04W 12/06* (2013.01); *H04L 2209/80* (2013.01); *H04L 2209/84* (2013.01)

(58) Field of Classification Search
None
See application file for complete search history.

(56) References Cited

U.S. PATENT DOCUMENTS 7,430,295 B1 *   9/2008   Pearson ................. H04B 10/70
                                                                  380/278
7,460,670 B1 *  12/2008   Elliott .................. H04L 9/0858
                                                                  709/224

(Continued)

FOREIGN PATENT DOCUMENTS

EP           3709563 A1      9/2020

OTHER PUBLICATIONS

Ma, Hongyang; Wang, Shumei. High performance quantum cryptography architectures in IEEE 802.11 WLAN. 2010 2nd International Conference on Advanced Computer Control. https://ieeexplore.ieee.org/stamp/stamp.jsp?tp=&arnumber=5486846 (Year: 2010).*

(Continued)

*Primary Examiner* — Jeremiah L Avery

(57) ABSTRACT

A wireless User Equipment (UE) performs quantum authentication with a wireless communication network. The wireless UE receives qubits that were generated by the wireless communication network and determines polarization states for the qubits. The wireless UE exchanges cryptography information with the wireless communication network. The wireless UE and the wireless communication network both generate cryptography keys based on the polarization states and the cryptography information. The wireless UE generates authentication data based the cryptography keys. The wireless UE wirelessly transfers the authentication data to the wireless communication network. The wireless communication network authenticates the wireless UE based on the authentication data and the cryptography keys.

20 Claims, 10 Drawing Sheets

(56) References Cited

U.S. PATENT DOCUMENTS

| | | | |
|---|---|---|---|
| 10,616,934 B2 | 4/2020 | Talebi Fard et al. | |
| 10,863,494 B2 | 12/2020 | Zhang et al. | |
| 2007/0076884 A1* | 4/2007 | Wellbrock | H04L 9/0855 380/263 |
| 2007/0130455 A1* | 6/2007 | Elliott | H04L 9/0858 713/150 |
| 2007/0192598 A1* | 8/2007 | Troxel | H04L 9/0852 713/168 |
| 2013/0083926 A1 | 4/2013 | Hughes et al. | |
| 2016/0285629 A1* | 9/2016 | Tanizawa | H04L 9/0852 |
| 2019/0149365 A1 | 5/2019 | Chatterjee et al. | |
| 2019/0174449 A1 | 6/2019 | Shan et al. | |
| 2020/0351087 A1* | 11/2020 | Mccandlish | H04L 9/0819 |
| 2020/0382293 A1* | 12/2020 | Cambou | H04L 9/0866 |
| 2021/0044433 A1* | 2/2021 | Hay | H04L 9/0855 |
| 2021/0105135 A1* | 4/2021 | Figueroa | H04L 9/0858 |

OTHER PUBLICATIONS

Lin, Tien-Sheng et al. Quantum circuits and quantum message integrity. 2011 Carnahan Conference on Security Technology. https://ieeexplore.ieee.org/stamp/stamp.jsp?tp=&arnumber=6095928 (Year: 2011).*

Nagy, Naya et al. Communicating Secret Information without Secret Messages in Wireless Sensor Networks. 2015 Fifth International Conference on e-Learning (econf). https://ieeexplore.ieee.org/stamp/stamp.jsp?tp=&arnumber=7478208 (Year: 2015).*

Lin, Tien-Sheng; Kuo, Sy-Yen. Secure quantum packet transmission mechanism for wireless networks. 2008 42nd Annual IEEE International Carnahan Conference on Security Technology. https://ieeexplore.ieee.org/stamp/stamp.jsp?tp=&arnumber=4751272 (Year: 2008).*

Li, Jung-Shian; Yang, Ching-Fang. Quantum communication in distributed wireless sensor networks. 2009 IEEE 6th International Conference on Mobile Adhoc and Sensor Systems. https://ieeexplore.ieee.org/stamp/stamp.jsp?tp=&arnumber=5337016 (Year: 2009).*

Kanamori, et al.; "On Quantum Authentication Protocols"; IEEE Globecom; 2005; pp. 1650-1654; IEEE.

Zisu; "Quantum High Secure Direct Communication with Authentication"; IEEE; 2020; pp. 129-132; IEEE.

Rajakumar Arul, et al.; "A Quantum-safe Key Hierarchy and Dynamic Security Association for LTE/SAE in 5G Scenario"; IEEE; Nov. 2, 2019; pp. 1-9; IEEE.

Chris J. Mitchell; "The impact of quantum computing on real-world security: A 5G case study"; Computers & Security, Apr. 3, 2020; pp. 1-11; vol. 93; Elsevier Science Publishers; Amsterdam, Netherlands.

* cited by examiner

QUANTUM AUTHENTICATION IN WIRELESS COMMUNICATION NETWORKS

RELATED CASES

This United States patent application is a continuation of U.S. patent application Ser. No. 17/325,857 that was filed on May 20, 2021 and is entitled "QUANTUM AUTHENTICATION IN WIRELESS COMMUNICATION NETWORKS." U.S. patent application Ser. No. 17/325,857 is hereby incorporated by reference into this United States patent application.

TECHNICAL BACKGROUND

Wireless communication networks provide wireless data services to wireless user devices. Exemplary wireless data services include machine-control, internet-access, media-streaming, and social-networking. Exemplary wireless user devices comprise phones, computers, vehicles, robots, and sensors. The wireless communication networks have Radio Access Networks (RANs) which exchange wireless signals with the wireless user devices over radio frequency bands. The wireless signals use wireless network protocols like Fifth Generation New Radio (5GNR), Long Term Evolution (LTE), Institute of Electrical and Electronic Engineers (IEEE) 802.11 (WIFI), and Low-Power Wide Area Network (LP-WAN). The RANs exchange network signaling and user data with network elements that are often clustered together into wireless network cores. The RANs are connected to the wireless network cores over backhaul data links.

The RANs comprise Radio Units (RUs), Distributed Units (DUs) and Centralized Units (CUs). The RUs are mounted at elevation and have antennas, modulators, signal processor, and the like. The RUs are connected to the DUs which are usually nearby network computers. The DUs handle lower wireless network layers like the Physical Layer (PHY) and Media Access Control (MAC). The DUs are connected to the CUs which are larger computer centers that are closer to the network cores. The CUs handle higher wireless network layers like the Radio Resource Control (RRC) and Packet Data Convergence Protocol (PDCP). The CUs are coupled to network functions in the network cores. The network cores execute the network functions to provide wireless data services to the wireless user devices over the RANs. Exemplary network functions include Access and Mobility Management Functions (AMFs), Authentication Server Functions (AUSF), and Unified Data Managements (UDMs).

Authentication entails the exchange of data between a wireless user device and a wireless communication network so the network can confirm the identity of the wireless user device. When the wireless user device attaches to the network core over the RAN, the wireless user device registers with an AMF to perform authentication. The AMF interacts with the AUSF and UDM to generate a random number and an expected result. The wireless user device is given the random number to hash with its secret identity code and return the expected result. The AMF matches the two expected results to authenticate the wireless user device. Responsive to the authentication, the wireless user device receives wireless data services from the network core.

Quantum authentication uses the quantum properties of photons to generate secret identity codes. To generate a secret identity code, a quantum device encodes a photon with various quantum states like polarization and spin. The quantum device transfers the encoded photon to another quantum device over an optical interface like a quantum channel. The other quantum device determines the quantum states of the photon. The two quantum devices exchange data to select matching quantum states. The matching quantum states comprise the secret identity code for the two quantum devices.

Unfortunately, the AMFs and AUSFs do not effectively use quantum authentication for the wireless user devices. Moreover, the UDMs do not efficiently generate secret identity codes for the wireless user devices using quantum authentication.

TECHNICAL OVERVIEW

A wireless User Equipment (UE) performs quantum authentication with a wireless communication network. The wireless UE receives qubits that were generated by the wireless communication network and determines polarization states for the qubits. The wireless UE exchanges cryptography information with the wireless communication network. The wireless UE and the wireless communication network both generate cryptography keys based on the polarization states and the cryptography information. The wireless UE generates authentication data based the cryptography keys. The wireless UE wirelessly transfers the authentication data to the wireless communication network. The wireless communication network authenticates the wireless UE based on the authentication data and the cryptography keys.

DETAILED DESCRIPTION

Figure 1:
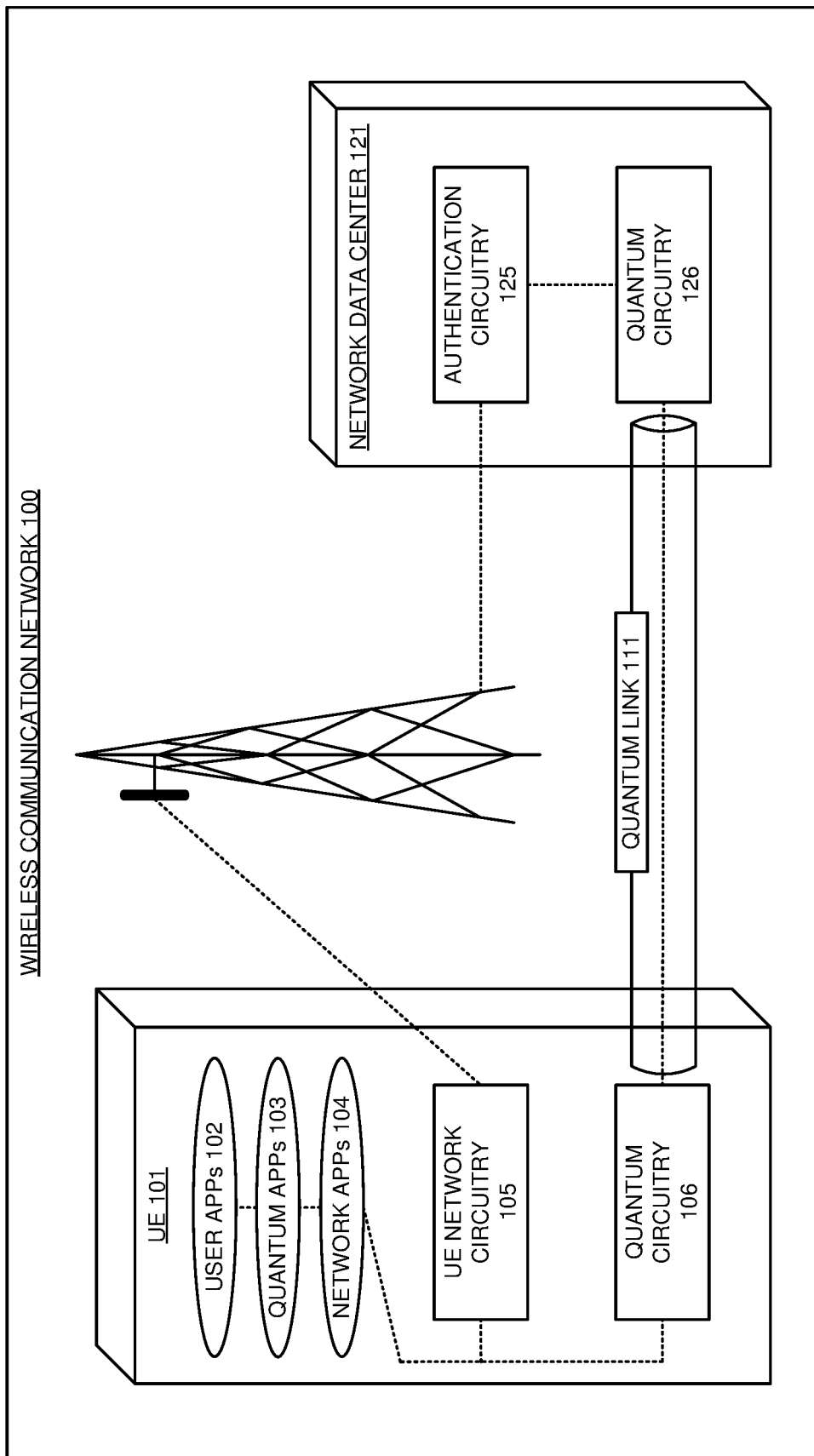
FIG. 1 illustrates a wireless communication network to perform quantum authentication for a wireless User Equipment (UE).

FIG. 1 illustrates wireless communication network 100 network to perform quantum authentication for wireless User Equipment (UE) 101. Wireless communication network 100 delivers services to UE 101 like machine communications, internet-access, media-streaming, or some other wireless communications product. Wireless communication network 100 comprises UE 101, quantum link 111, and network data center 121. UE 101 comprises user application (APPs) 102, quantum applications 103, network applications 104, UE network circuitry 105, and UE quantum circuitry 106. Network data center 121 comprises network authentication circuitry 125 and network quantum circuitry 126. UE quantum circuitry 106 is detachably coupled to quantum circuitry 126 over quantum link 111. UE network circuitry 105 is wirelessly coupled to network authentication circuitry 125 over a wireless access point.

Various examples of network operation and configuration are described herein. In some examples, network quantum circuitry 126 generates qubits and transfers the qubits to UE quantum circuitry 106. For example, network quantum circuitry 126 may polarize and transfer photons to UE 106 over quantum link 111. UE quantum circuitry 106 processes the qubits and responsively determines polarization states for the qubits. UE quantum circuitry 106 and network quantum circuitry 126 exchange cryptography information. UE quantum circuitry 106 generates cryptography keys based on the polarization states and cryptography information and transfers the cryptography keys to UE network circuitry 105. Network quantum circuitry 126 generates the cryptography keys based on the polarization states and the cryptography information and transfers the cryptography keys to network authentication circuitry 125. UE network circuitry 105 processes the cryptography keys to generate authentication data. For example, UE network circuitry may use the quantum key to hash a random number to generate authentication data to authenticate with network authentication circuitry 125. UE network circuitry 105 wirelessly transfers the authentication data for delivery to network authentication circuitry 125. Network authentication circuitry 125 responsively authenticates UE 101 based on the authentication data and the cryptography keys. Advantageously, the authentication circuitry 125 effectively uses quantum authentication for UE 101. Moreover, UE quantum circuitry 106 and network quantum circuitry 126 efficiently generates cryptography keys for UE 101 using quantum authentication.

In some examples, UE quantum circuitry 106 generates additional cryptography keys based on additional qubits and transfers the additional cryptography keys to UE network circuitry 105. UE network circuitry 105 and network data center 121 use the additional cryptography keys to encrypt/decrypt network signaling and possibly user data. Advantageously, UE 101 effectively utilizes its quantum capabilities to securely communicate with network data center 121.

UE 101 and the wireless access point communicate over links using wireless technologies like Fifth Generation New Radio (5GNR), Long Term Evolution (LTE), Low-Power Wide Area Network (LP-WAN), Institute of Electrical and Electronic Engineers (IEEE) 802.11 (WIFI), Bluetooth, and/or some other type of wireless networking protocol. The wireless technologies use electromagnetic frequencies in the low-band, mid-band, high-band, or some other portion of the electromagnetic spectrum. UE 101 and network data center 121 communicate over quantum link 111. Quantum link 111 comprises metallic links, glass fibers, a vacuum, and/or some other type of medium that can transfer quantum information. Quantum link 111 supports quantum authentication technologies like Quantum Key Distribution (QKD), quantum cryptography, and/or other types of cryptography protocols that utilize quantum mechanics. The wireless access point and network data center 121 communicate over various links that use metallic links, glass fibers, radio channels, or some other communication media. The links use Fifth Generation Core (5GC), IEEE 802.3 (Ethernet), Time Division Multiplex (TDM), Data Over Cable System Interface Specification (DOCSIS), Internet Protocol (IP), General Packet Radio Service Transfer Protocol (GTP), 5GNR, LTE, WIFI, virtual switching, inter-processor communication, bus interfaces, and/or some other data communication protocols.

UE 101 comprises a vehicle, drone, robot, computer, phone, sensor, or another type of data appliance with wireless and quantum circuitry. The wireless access point is depicted as a tower, but the wireless access point may use another mounting structure or no mounting structure at all. The wireless access point comprises a Fifth Generation (5G) RAN, LTE RAN, gNodeB, eNodeB, NB-IoT access node, LP-WAN base station, wireless relay, WIFI hotspot, Bluetooth access nodes, and/or another wireless network transceiver. UE 101 and the wireless access point comprise antennas, amplifiers, filters, modulation, analog/digital interfaces, microprocessors, software, memories, transceivers, bus circuitry, and the like. Authentication circuitry 125 comprises network functions like Access and Mobility Management functions (AMFs), Authentication Server Functions (AUSFs), Unified Data Management (UDM), and the like. Network quantum circuitry 126 comprises network functions like a quantum capable UDM. UE 101, the wireless access point, and network data center 121 comprise microprocessors, software, memories, transceivers, bus circuitry, and the like. The microprocessors comprise Digital Signal Processors (DSP), Central Processing Units (CPU), Graphical Processing Units (GPU), Application-Specific Integrated Circuits (ASIC), and/or the like. The memories comprise Random Access Memory (RAM), flash circuitry, disk drives, and/or the like. The memories store software like operating systems, user applications, radio applications, and network functions. The microprocessors retrieve the software from the memories and execute the software to drive the operation of wireless communication network 100 as described herein.

Figure 2:
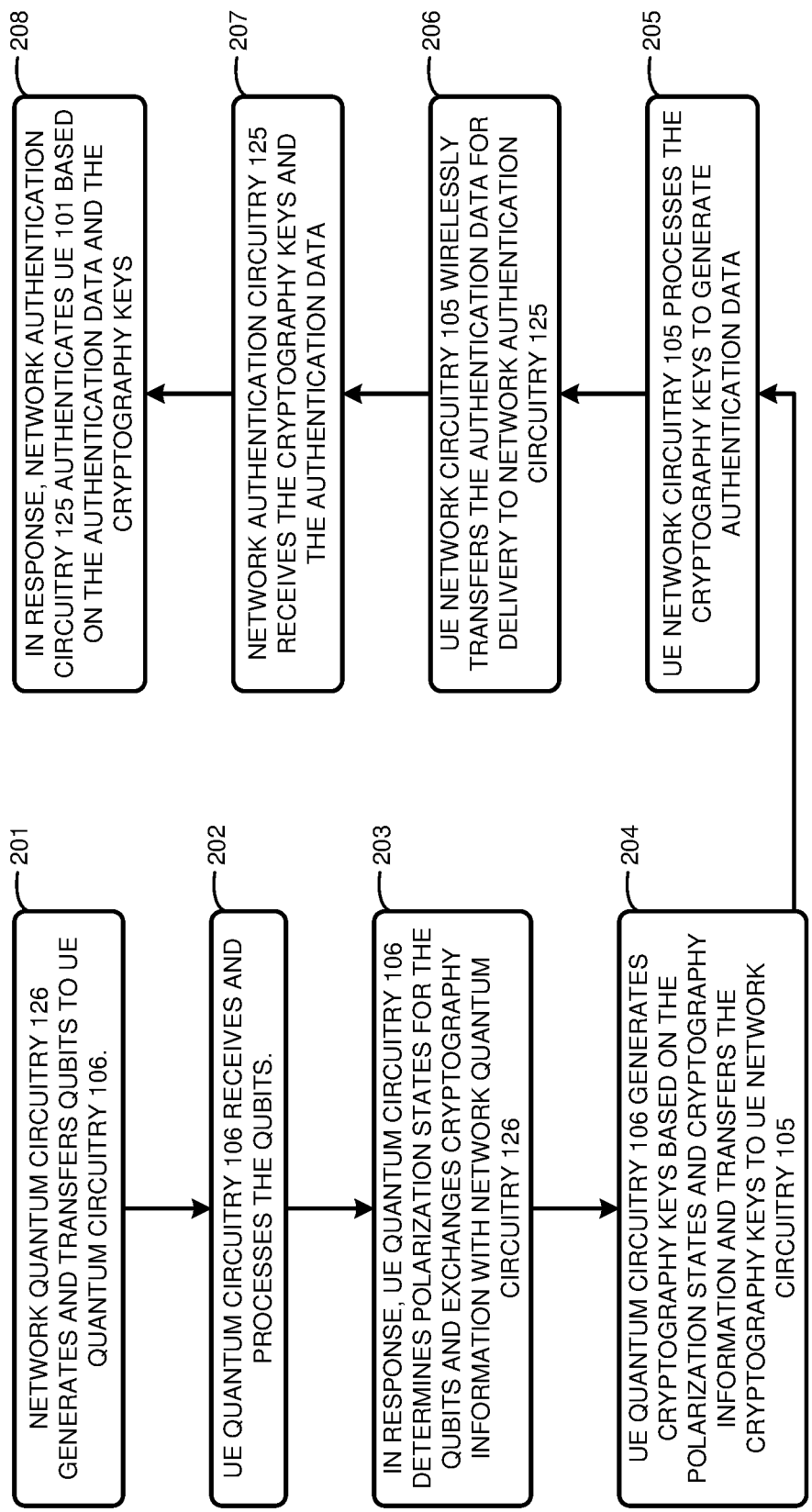
FIG. 2 illustrates an exemplary operation of the wireless communication network to perform quantum authentication for the wireless UE.

FIG. 2 illustrates an exemplary operation of wireless communication network 100 to perform quantum authentication for wireless UE 101. The operation may vary in other examples. Network quantum circuitry 126 generates and transfers qubits to UE quantum circuitry 106 (201). UE quantum circuitry 106 receives and processes the qubits (202). In response, UE quantum circuitry 106 determines polarization states for the qubits and exchanges cryptography information with network quantum circuitry 126 (203). For example, UE quantum circuitry 106 may exchange quantum information with network quantum circuitry 126 that indicates the measured polarizations of the qubits. UE quantum circuitry 106 generates cryptography keys based on the polarization states and cryptography information and transfers the cryptography keys to UE network circuitry 105 (204). UE network circuitry 105 processes the cryptography keys to generate authentication data (205). UE network circuitry 105 wirelessly transfers the authentication data for delivery to network authentication circuitry 125 (206). Network authentication circuitry 125 receives the cryptography keys and the authentication data (207). In response, network authentication circuitry 125 authenticates UE 101 based on the authentication data and the cryptography keys (208).

Figure 3:
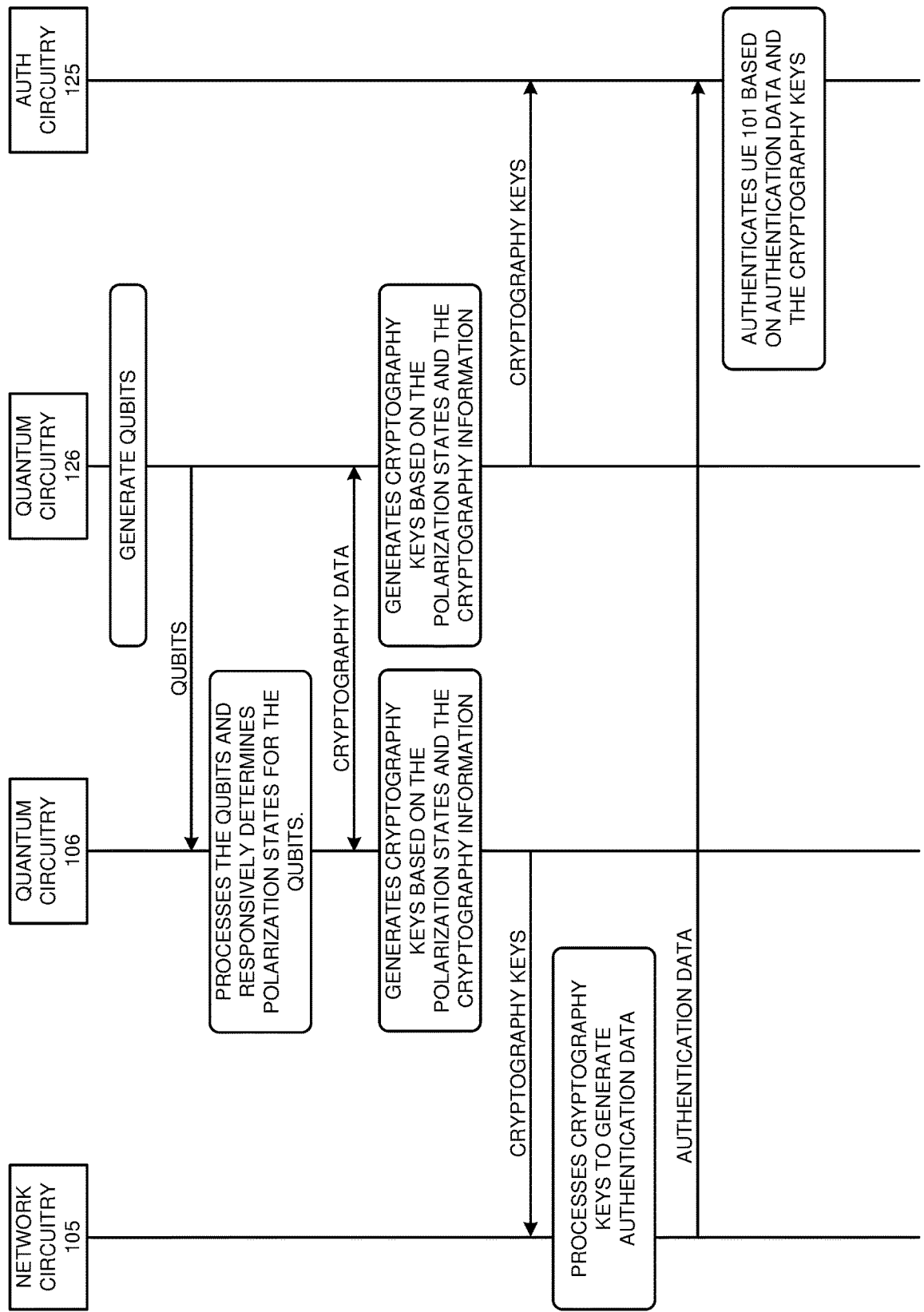
FIG. 3 illustrates another exemplary operation of the wireless communication network to perform quantum authentication for the wireless UE.

FIG. 3 illustrates an exemplary operation of wireless communication network 100 to perform quantum authentication for wireless UE 101. The operation may vary in other examples. Network quantum circuitry 126 generates qubits. The qubits may comprise photons, electrons, atoms, or other types of particles that can transfer quantum information. For example, quantum circuitry 126 may polarize photons with different polarization states to generate the qubits. Network quantum circuitry 126 transfers the qubits over quantum link 111 to UE quantum circuitry 106. UE quantum circuitry 106 processes the qubits and responsively determines polarization states for the qubits. Typically, UE quantum circuitry 106 selects a measurement basis for each qubit and determines the polarization states for the qubits using the selected measurement bases. UE quantum circuitry 106 exchanges cryptography data that indicates the determined polarization states with network quantum circuitry 126. Network quantum circuitry 126 exchanges cryptography data that indicates the selected polarization states with UE quantum circuitry 106.

Network quantum circuitry 126 and UE quantum circuitry 106 generate cryptography keys based on the polarization states and the cryptography information. For example, UE quantum circuitry 106 and network quantum circuitry 126 may compare the polarization states determined by UE quantum circuitry 106 with the polarization states selected by network quantum circuitry 126 to derive a quantum-based authentication key. UE quantum circuitry 106 transfers the cryptography keys to UE network circuitry 105. Likewise, quantum circuitry 126 transfers the cryptography keys to authentication circuitry 125.

UE network circuitry 105 processes the cryptography keys to generate authentication data. The authentication data comprises hashes, digital certificates, or another type of authentication data to authenticate UE 101 with network data center 121. For example, UE network circuitry 105 may receive an authentication challenge from network authentication circuitry 125 and use the quantum key to resolve the authentication challenge and generate authenticate data that indicates the resolution. UE network circuitry 105 wirelessly transfers the authentication data to network authentication circuitry 125 over the wireless access point. Network authentication circuitry 125 authenticates UE 101 based on the authentication data and the cryptography keys. For example, network authentication circuitry 125 may receive authentication data that indicates an authentication result from UE 401 and use its quantum-based cryptography key to verify the authentication result supplied by UE 401.

Figure 4:
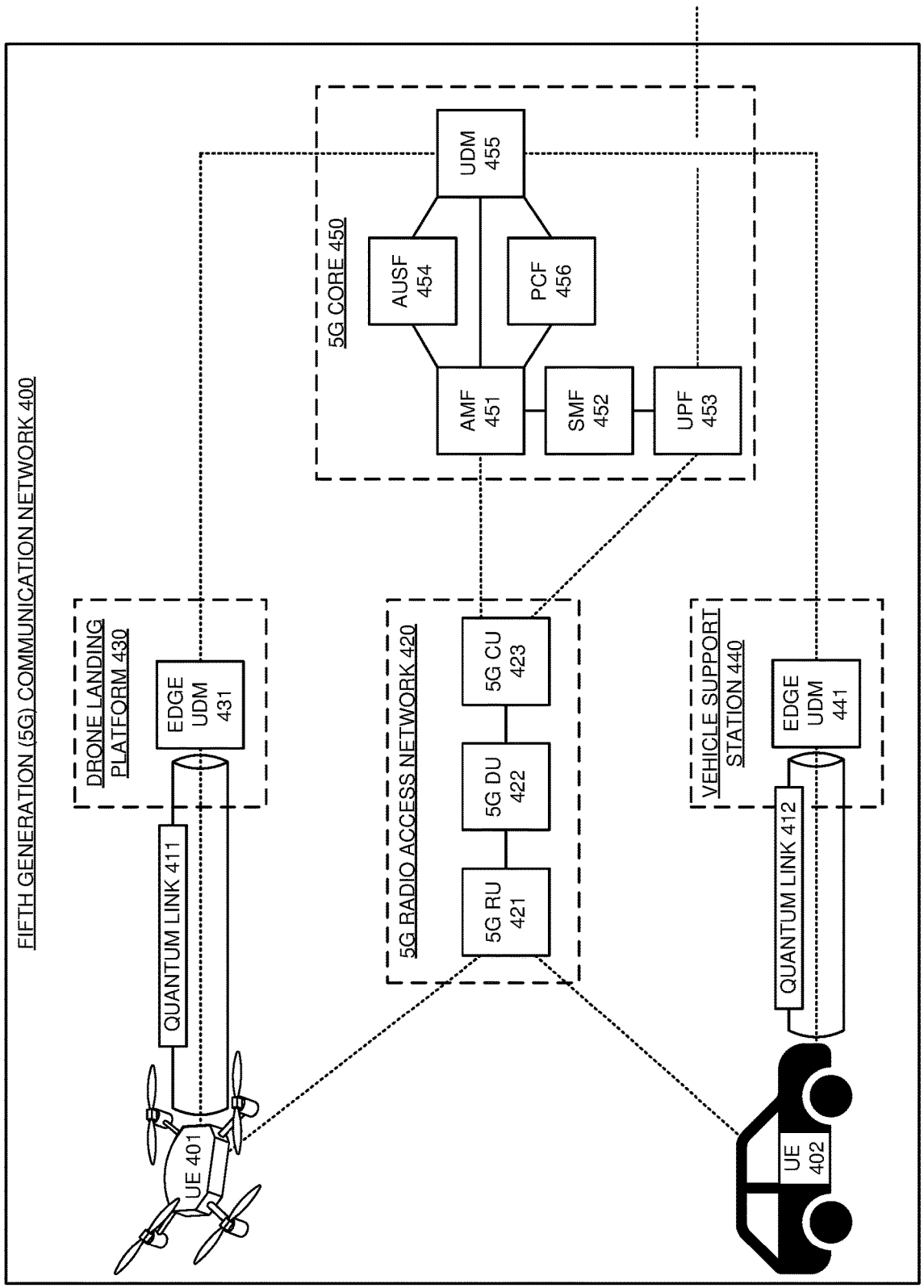
FIG. 4 illustrates a Fifth Generation (5G) communication network to perform quantum authentication for quantum capable 5G UEs.

FIG. 4 illustrates Fifth Generation (5G) communication network 400 to perform quantum authentication for UEs 401 and 402. 5G communication network 400 comprises an example of wireless communication network 100, although network 100 may differ. 5G communication network 400 comprises 5G UEs 401-402, quantum links 411-412, 5G RAN 420, drone landing platform 430, vehicle support station 440, and 5G network core 450. 5G UE 401 comprises a quantum capable unmanned aerial drone. 5G UE 402 comprises a quantum capable vehicle. 5G RAN 420 comprises 5G Radio Unit (RU) 421, 5G Distributed Unit (DU) 422, and 5G Centralized Unit (CU) 423. Drone landing platform 430 comprises edge Unified Data Management (UDM) 431. Vehicle support station 440 comprises edge UDM 441. 5G network core 450 comprises Access and Mobility Management Function (AMF) 451, Session Management Function (SMF) 452, User Plane Function (UPF) 453, Authentication Server Function (AUSF) 454, UDM 455, and Policy Control Function (PCF) 455. Other network functions and network elements are typically present in 5G network core 450 but are omitted for clarity.

UE 401 detachably couples to edge UDM 431 in drone landing platform 430 over quantum link 411. Quantum link 411 comprises an optical interface, metallic links, glass fibers, a vacuum, and/or some other type of medium that can transfer or some other type of quantum capable interface that can transfer qubits between UE 401 and edge UDM 431. UE 401 authenticates with drone landing platform 430. For example, UE 401 may wirelessly communicate with drone landing platform 430 to authenticate itself via Fifth Generation Authentication Key Agreement (5G AKA), Extensible Authentication Protocol (EAP), or some other type of authentication protocol. In some examples, UE 401 may have pre-authenticated with 5G core 450. For example, 5G network 400 may configured UE 401 with a unique ID that indicates its identity and quantum capability, and UE 401 may use this unique ID to authenticate itself with drone landing platform 430 to initiate quantum authentication. In response to the authentication, edge UDM 431 initiates a Quantum Key Distribution (QKD) procedure with UE 401. The QKD procedure comprises QKD protocols like BB84 protocol, an E91 protocol, or another type of QKD protocol. Edge UDM 431 generates qubits for UE 401. The number of qubits generated by edge UDM 431 is not limited. Edge UDM 431 selects a polarization basis for individual ones of the qubits and polarizes the qubits using their selected polarization bases. Typically, edge UDM 431 selects either a vertical or horizontal polarization basis for each of the qubits. A vertically polarized qubit may comprise a vertical sinusoidal plane electromagnetic wave and a horizontally polarized qubit may comprise a horizontal sinusoidal plane electromagnetic wave. Edge UDM 431 transfers the polarized qubits to UE 401 over quantum link 411. The qubits may comprise entangled or non-entangled qubits. For example, edge UDM 431 may entangle pairs of photons and transfer one of the photons from each entangled pair to UE 401.

UE 401 receives the qubits from edge UDM 431. UE 401 selects a measurement basis for individual ones of the qubits received from edge UDM 431. For example, UE 401 may select a rectilinear measurement basis for a first qubit and may select a diagonal measurement basis for a second qubit. UE 401 determines the polarizations of the received qubits using the corresponding measurement basis for each of the received qubits. UE 401 wirelessly indicates the determined polarizations of the received qubits to edge UDM 431. Edge UDM 431 wirelessly indicates the polarizations it selected for each of the transferred qubits to UE 401. Edge UDM 431 and UE 401 generate an authentication key for UE 401 based on the determined polarizations of the received qubits and the selected polarizations for the transferred qubits. Typically, UDM 431 and UE 401 derive the key based on the qubits where the polarizations for the transferred qubits matched the determined polarizations for the received qubits. UDM 431 transfers the authentication key for UE 401 to UDM 455 over a secure channel. The secure channel could be an encrypted data link, although other forms of private communication including hand/drone delivery are possible.

To generate communication keys, edge UDM 431 initiates another QKD procedure with UE 401. Edge UDM 431 generates additional qubits for UE 401. Edge UDM 431 selects a polarization basis for individual ones of the additional qubits and polarizes the additional qubits using their selected polarization bases. Edge UDM 431 transfers the additional polarized qubits to UE 401 over quantum link 411. UE 401 receives the additional qubits from edge UDM 431. UE 401 determines the polarizations of the additional qubits. UE 401 wirelessly indicates the determined polarizations of the additional qubits to edge UDM 431. Edge UDM 431 and UE 401 generate communication keys for UE 401 based on the determined polarizations of the additional qubits. UDM 431 transfers the communication keys for UE 401 to UDM 455 over the secure channel. UE 401 detaches from drone landing platform 430 and moves to another location.

UE 401 wirelessly attaches to RU 421 and transfers attachment signaling to CU 423 over RU 421 and DU 422. CU 423 establishes a Radio Resource Control (RRC) connection with UE 401. CU 423 transfers a registration request for UE 401 to AMF 451. AMF 451 transfers an identity request for UE 401 in Non-Access Stratum (NAS) signaling to CU 423. CU 423 forwards the identity request to UE 401 over DU 422 and RU 421. In response, UE 401 indicates its identity to CU 423 over RU 421 and DU 423. CU 423 forwards the identity indication for UE 401 to AMF 451. AMF 451 selects AUSF 454 to authenticate UE 401 for wireless services. AMF 451 transfers an authentication request for UE 401 to AUSF 454.

AUSF 454 selects UDM 455 to authenticate UE 401. AUSF 454 requests authentication keys for UE 401 from UDM 455. UDM 455 transfers authentication data for UE 401 to AUSF 454. The authentication data indicates the quantum derived authentication key for UE 401. AUSF 454 uses the quantum derived authentication key for UE 401 and a random number to generate an expected result. AUSF 454 transfers the random number and the expected result for UE 401 to AMF 451. AMF 451 transfers the random number for UE 401 to CU 423 in NAS signaling. CU 423 forwards the random number to UE 401 in NAS signaling over DU 422 and RU 421. UE 401 hashes the random number with its quantum derived authentication key to generate the same expected result. UE 401 transfers the expected result to CU 423. CU 423 forwards the expected result to AMF 451. AMF 451 matches the two expected results to authenticate the identity of UE 401.

Responsive to the authentication and authorization, AMF 451 requests UE context for UE 401 from UDM 455. UDM 455 transfers UE context for UE 401 to AMF 451. The UE context comprises the quantum communication keys, Quality-of-Service (QoS) metrics, default slice identifiers, and default network addresses in accordance with the roaming agreement. AMF 451 interacts with PCF 456 to retrieve service policies for UE 401. AMF 451 selects SMF 452 to establish a Protocol Data Unit (PDU) session for UE 401 based on the UE context and the service policies. SMF 452 interacts with UPF 453 to establish the PDU session for UE 401. SMF 452 transfers session context for the PDU session to AMF 451. AMF 451 transfers the session context to UE 401 over RAN 420, and AMF 451 and UE 401 may use the quantum communication keys for encryption/decryption of the network signaling. UE 401 uses the context to initiate the PDU session. UE 401 wirelessly exchanges user data with CU 423 over RU 421 and DU 422. CU 423 exchanges the user data with UPF 453. UE 401 and UPF 453 may also quantum communication keys for encryption/decryption of the user data. UPF 453 exchanges the user data with external systems and may use the quantum communication keys for end-to-end security—the quantum communication keys being securely communicated to the end point.

In a similar manner, UE 402 detachably couples to edge UDM 441 in vehicle support station 440 over quantum link 412. Quantum link 412 comprises an optical interface, metallic links, glass fibers, a vacuum, and/or some other type of medium that can transfer or some other type of quantum capable interface that can transfer qubits between UE 401 and edge UDM 431. UE 402 authenticates with vehicle support station 440. In response to the authentication, edge UDM 441 initiates a QKD procedure with UE 402. Edge UDM 441 generates qubits for UE 402. Edge UDM 441 selects a polarization basis for individual ones of the qubits and polarizes the qubits in accordance with their selected polarization bases. Edge UDM 441 transfers the polarized qubits to UE 402 over quantum link 412. UE 402 receives the qubits from edge UDM 441. UE 402 selects a measurement basis for each of the individual qubits received from edge UDM 441. UE 402 determines the polarizations of the received qubits using the corresponding selected measurement basis for each of the received qubits. UE 402 wirelessly indicates the determined polarizations of the received qubits to edge UDM 441. Edge UDM 441 wirelessly indicates the polarizations it selected for each of the transferred qubits to UE 402. Edge UDM 441 and UE 402 generate an authentication key for UE 402 based on the determined polarizations of the received qubits and the selected polarizations for the transferred qubits. Edge UDM 441 transfers the authentication key for UE 402 to UDM 455 over a classical communications channel. For example, edge UDM 441 may encrypt the quantum authentication key for UE 402 using a 5GC cryptography protocol and transfer the quantum authentication key to UDM 455 over a secure classical channel.

In some examples, UEs 401-402 may lack the ability to process and determine polarizations of qubits. In this case, drone landing platform 430 and/or vehicle support station 440 identify the qubit polarizations for UEs 401-402 and indicate the polarization states to UEs 401-402. UEs 401-402 may use the indicated polarizations to derive their quantum-based authentication keys.

To generate communication keys, edge UDM 441 initiates another QKD procedure with UE 402. Edge UDM 441 generates additional qubits for UE 402. Edge UDM 441 selects a polarization basis for individual ones of the additional qubits and polarizes the additional qubits using their selected polarization bases. Edge UDM 441 transfers the additional polarized qubits to UE 402 over quantum link 412. UE 402 receives the additional qubits from edge UDM 441. UE 402 determines the polarizations of the additional qubits. UE 402 wirelessly indicates the determined polarizations of the additional qubits to edge UDM 441. Edge UDM 441 and UE 402 generate communication keys for UE 402 based on the determined polarizations of the additional qubits. UDM 441 transfers the communication keys for UE 402 to UDM 455 over the secure channel. UE 402 detaches from vehicle support station 440 and moves to another location.

UE 402 wirelessly attaches to RU 421 and transfers attachment signaling to CU 423 over RU 421 and DU 422. CU 423 establishes an RRC connection with UE 402. CU 423 transfers a registration request for UE 402 to AMF 451. AMF 451 transfers an identity request to UE 402 in NAS signaling over RAN 420. In response, UE 402 indicates its identity to AMF 451 over RAN 420. AMF 451 selects AUSF 454 to authenticate UE 402 for wireless services and transfers an authentication request for UE 402.

AUSF 454 selects UDM 455 to authenticate UE 402. AUSF 454 requests authentication keys for UE 402 from UDM 455. UDM 455 transfers authentication data for UE 401 that indicates the quantum derived authentication key to AUSF 454. AUSF 454 uses the quantum derived authentication key for UE 402 and a random number to generate an expected result. AUSF 454 transfers the random number and the expected result for UE 402 to AMF 451. AMF 451 transfers the random number for UE 401 to over RAN 420. UE 402 hashes the random number with its quantum derived authentication key to generate the same expected result. UE 402 transfers the expected result to AMF 451 over RAN 420. AMF 451 matches the two expected results to authenticate the identity of UE 402.

Responsive to the authentication and authorization, AMF 451 retrieves UE context for UE 402 from UDM 455. AMF 451 retrieves retrieve service policies for UE 402 from PCF 456. AMF 451 selects SMF 452 to establish a PDU session for UE 402 based on the UE context and the service policies. SMF 452 selects UPF 453 to establish the PDU session for UE 402. SMF 452 transfers session context for the PDU session to AMF 451. AMF 451 transfers the session context to UE 402 over RAN 420. AMF 451 and UE 402 may use the quantum communication key for UE 402 for encryption/decryption of network signaling. UE 402 uses the context to initiate the PDU session. UE 402 wirelessly exchanges user data with UPF 453 over RAN 420. UPF 453 and UE 402 may use the quantum communication key for UE 402 for encryption/decryption of user data.

Figure 5:
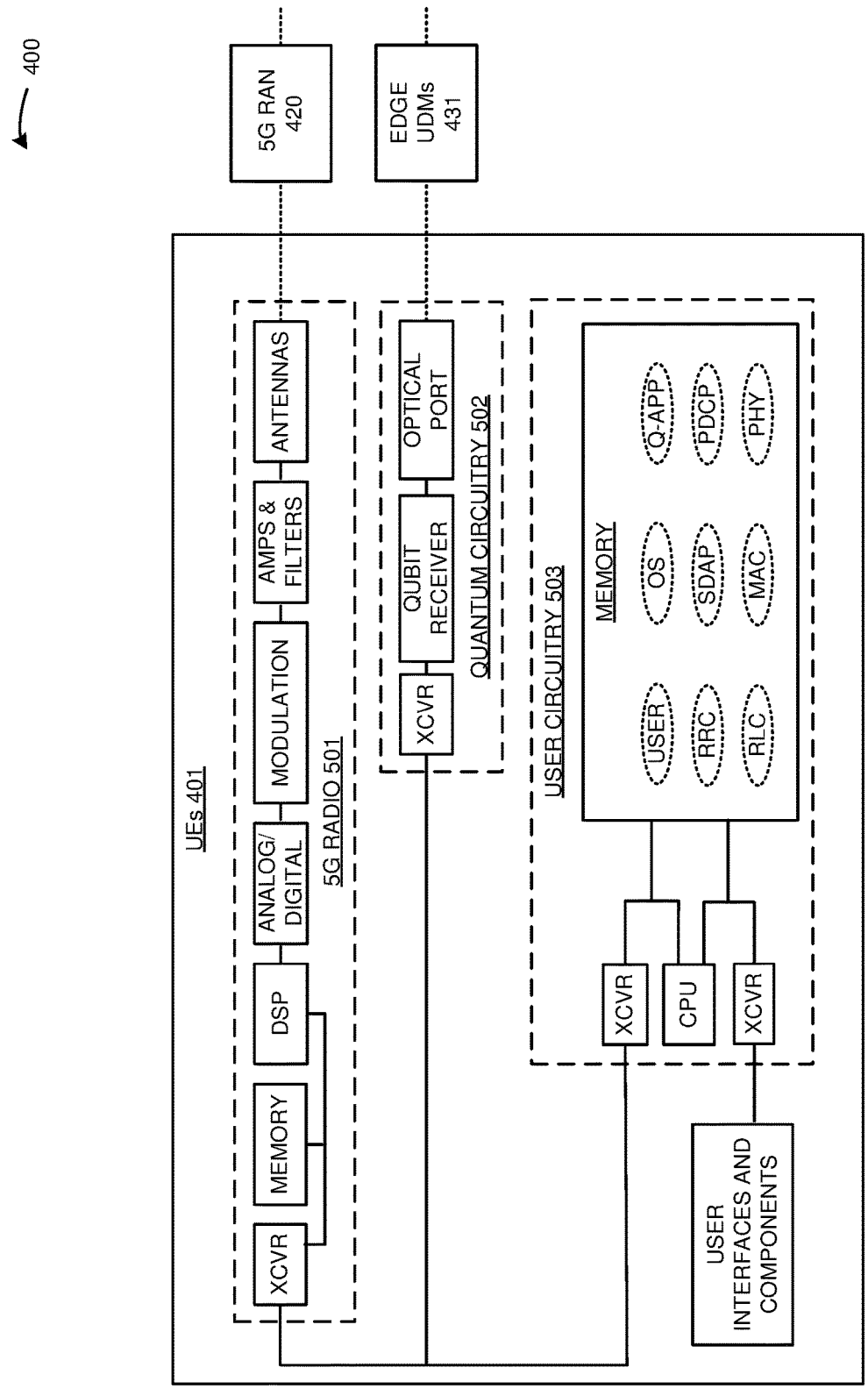
FIG. 5 illustrates the quantum capable 5G UEs in the 5G communication network.

FIG. 5 illustrates quantum capable 5G UEs 401 and 402 in 5G communication network 400. UEs 401 comprises an example of UE 101, although UE 101 may differ. UE 402 may comprise similar architecture to UE 401, however UE 402 may be different. UE 401 comprises 5G radio 501, quantum circuitry 502, and user circuitry 503. Radio 501 comprises antennas, amplifiers, filters, modulation, analog-to-digital interfaces, Digital Signal Processors (DSP), memory, and transceivers that are coupled over bus circuitry. Quantum circuitry 502 comprises an optical port, a qubit receiver, and transceivers that are coupled over bus circuitry. User circuitry 503 comprises memory, CPU, user interfaces and components, and transceivers that are coupled over bus circuitry. The memory in user circuitry 503 stores an operating system (OS), user applications (USER), Quantum Applications (Q-APP), and 5GNR network applications for Physical Layer (PHY), Media Access Control (MAC), Radio Link Control (RLC), Packet Data Convergence Protocol (PDCP), Service Data Adaptation Protocol (SDAP), and Radio Resource Control (RRC). The antenna in radio 501 is wirelessly coupled to 5G RAN 420 over a 5GNR link. The quantum interface in quantum circuitry 502 is coupled to edge UDM 431 over quantum link 411. A transceiver in radio 501 is coupled to a transceiver in user circuitry 503. A transceiver in quantum circuitry 502 is coupled to a transceiver in user circuitry 503. A transceiver in user circuitry 503 is typically coupled to the user interfaces and components like displays, controllers, and memory.

In radio 501, the antennas receive wireless signals from 5G RAN 420 that transport downlink 5GNR signaling and data. The antennas transfer corresponding electrical signals through duplexers to the amplifiers. The amplifiers boost the received signals for filters which attenuate unwanted energy. Demodulators down-convert the amplified signals from their carrier frequency. The analog/digital interfaces convert the demodulated analog signals into digital signals for the DSPs. The DSPs transfer corresponding 5GNR symbols to user circuitry 503 over the transceivers. In user circuitry 503, the CPU executes the network applications to process the 5GNR symbols and recover the downlink 5GNR signaling and data. The 5GNR network applications receive new uplink signaling and data from the user applications. The network applications process the uplink user signaling and the downlink 5GNR signaling to generate new downlink user signaling and new uplink 5GNR signaling. The network applications transfer the new downlink user signaling and data to the user applications. The 5GNR network applications process the new uplink 5GNR signaling and user data to generate corresponding uplink 5GNR symbols that carry the uplink 5GNR signaling and data.

In radio 501, the DSP processes the uplink 5GNR symbols to generate corresponding digital signals for the analog-to-digital interfaces. The analog-to-digital interfaces convert the digital uplink signals into analog uplink signals for modulation. Modulation up-converts the uplink analog signals to their carrier frequency. The amplifiers boost the modulated uplink signals for the filters which attenuate unwanted out-of-band energy. The filters transfer the filtered uplink signals through duplexers to the antennas. The electrical uplink signals drive the antennas to emit corresponding wireless 5GNR signals to 5G RAN 420 that transport the uplink 5GNR signaling and data.

In quantum circuitry 502, the optical port couples to one of edge UDM 431 over the quantum link 411. The quantum interface receives qubits from edge UDM 431 and passes the qubits to the qubit receiver. The qubit receiver determines the polarizations for the received qubits using measurement bases indicated by the Q-APP. The measurement bases used by the qubit receiver may be selected by the Q-APP at random, semi-random, or may be pre-defined. Typically, the selected measurement bases are chosen in a secure manner so that they remain private to the UE during key generation. The qubit receiver indicates the determined polarizations to user circuitry 503 over the transceivers.

The Q-APP in UE 401 and edge UDM 431 exchange the polarization states determined by the qubit processor and the polarization states that the edge UDM encoded the qubits with. The Q-APP UE 401 and the edge UDM may wirelessly exchange the polarization states over 5G radio 501 or quantum circuitry 502. The Q-APP compares the determined polarization states and the polarization states that the edge UDM encoded the qubits with. The Q-APP identifies qubits that have a determined polarization state that is the same as the encoded polarization state. Typically, around 50% of the qubits will have polarization states that will be the same. The Q-APP generates an authentication key based on the qubits with matching polarization states.

In some examples, UEs 401-402 may lack 5G radio capabilities and may instead attach to 5G network core 450 using non-Third Generation Partnership Project (3GPP) protocols like WIFE or ethernet. In this example, UEs 401-402 may attach to 5G network core 450 over a non-3GPP access node and a Non-3GPP Interworking Function (N3IWF). UEs 401-402 may use their quantum keys to authenticate with network core 450 over links that traverse the non-3GPP access node and the N3IWF.

RRC functions comprise authentication, security, handover control, status reporting, QoS, network broadcasts and pages, and network selection. SDAP functions comprise QoS marking and flow control. PDCP functions comprise security ciphering, header compression and decompression, sequence numbering and re-sequencing, de-duplication. RLC functions comprise Automatic Repeat Request (ARQ), sequence numbering and resequencing, segmentation and resegmentation. MAC functions comprise buffer status, power control, channel quality, Hybrid ARQ (HARM), user identification, random access, user scheduling, and QoS. PHY functions comprise packet formation/deformation, windowing/de-windowing, guard-insertion/guard-deletion, parsing/de-parsing, control insertion/removal, interleaving/de-interleaving, Forward Error Correction (FEC) encoding/decoding, channel coding/decoding, channel estimation/equalization, and rate matching/de-matching, scrambling/descrambling, modulation mapping/de-mapping, layer mapping/de-mapping, precoding, Resource Element (RE)

mapping/de-mapping, Fast Fourier Transforms (FFTs)/Inverse FFTs (IFFTs), and Discrete Fourier Transforms (DFTs)/Inverse DFTs (IDFTs). Q-APP functions comprise measurement basis selection, qubit polarization identification, and quantum key generation.

Figure 6:
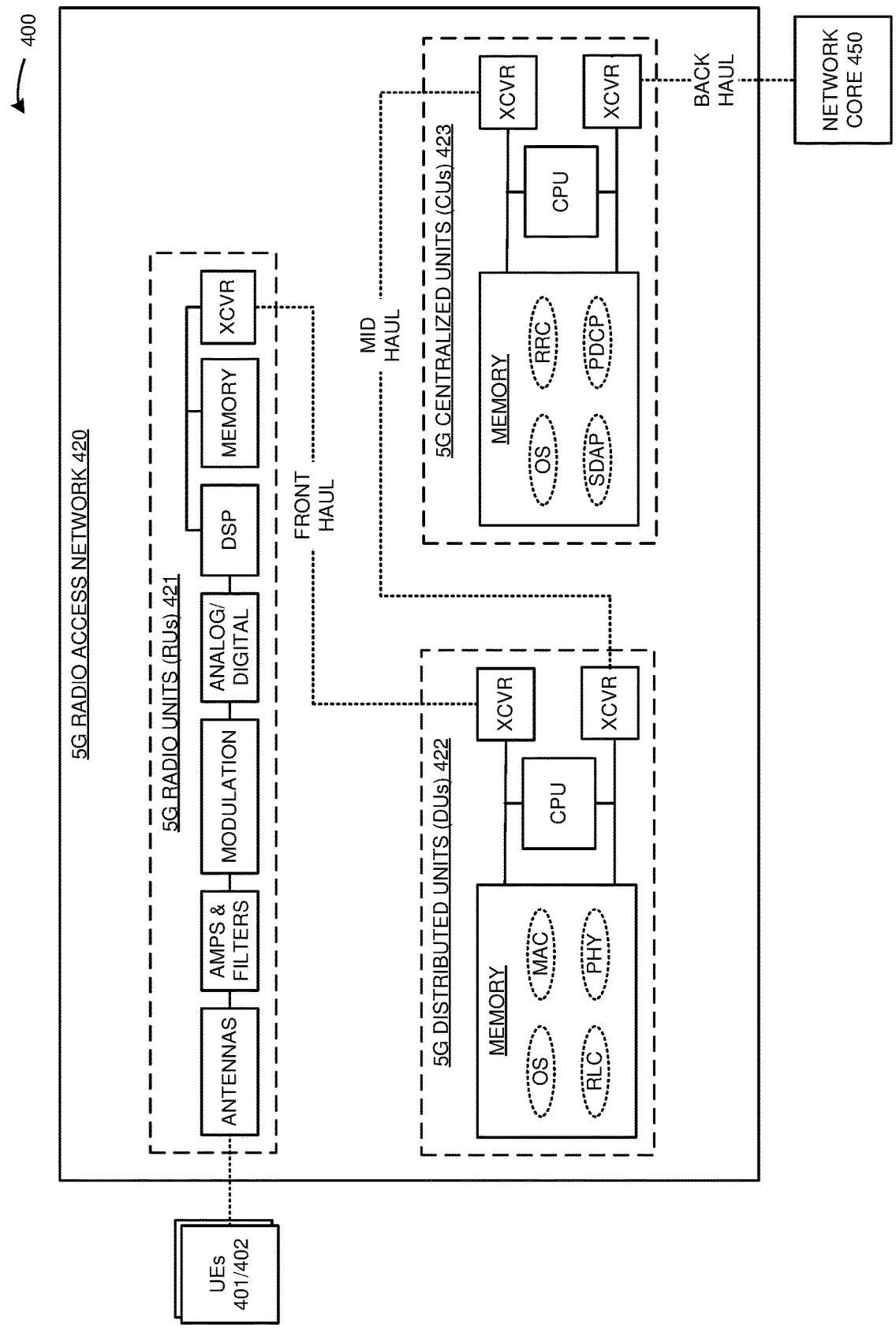
FIG. 6 illustrates 5G RANs in the 5G communication network.

FIG. 6 illustrates 5G RU 421, 5G DU 422, and 5G CU 423 in 5G communication network 400. RU 421, DU 422, and CU 423 comprise an example of the wireless access point illustrated in FIG. 1, although the wireless access point may differ. RU 421 comprises antennas, amplifiers, filters, modulation, analog-to-digital interfaces, DSP, memory, and transceivers (XCVRs) that are coupled over bus circuitry. UEs 401-402 are wirelessly coupled to the antennas in RU 421 over 5GNR links. Transceivers in 5G RU 421 are coupled to transceivers in 5G DU 422 over fronthaul links like enhanced Common Public Radio Interface (eCPRI). The DSPs in RU 421 executes their operating systems and radio applications to exchange 5GNR signals with UEs 401-402 and to exchange 5GNR data units with DU 422.

For the uplink, the antennas receive wireless signals from UEs 401-402 that transport uplink 5GNR signaling and data. The antennas transfer corresponding electrical signals through duplexers to the amplifiers. The amplifiers boost the received signals for filters which attenuate unwanted energy. Demodulators down-convert the amplified signals from their carrier frequencies. The analog/digital interfaces convert the demodulated analog signals into digital signals for the DSPs. The DSPs transfer corresponding 5GNR symbols to DU 422 over the transceivers.

For the downlink, the DSPs receive downlink 5GNR symbols from DU 422. The DSPs process the downlink 5GNR symbols to generate corresponding digital signals for the analog-to-digital interfaces. The analog-to-digital interfaces convert the digital signals into analog signals for modulation. Modulation up-converts the analog signals to their carrier frequencies. The amplifiers boost the modulated signals for the filters which attenuate unwanted out-of-band energy. The filters transfer the filtered electrical signals through duplexers to the antennas. The filtered electrical signals drive the antennas to emit corresponding wireless signals to 5G UEs 401-402 that transport the downlink 5GNR signaling and data.

DU 422 comprises memory, CPU, and transceivers that are coupled over bus circuitry. The memory in 5G DU 422 stores operating systems and 5GNR network applications like PHY, MAC, and RLC. CU 423 comprises memory, CPU, and transceivers that are coupled over bus circuitry. The memory in CU 423 stores an operating system and 5GNR network applications like PDCP, SDAP, and RRC. Transceivers in 5G DU 422 are coupled to transceivers in RU 421 over front-haul links. Transceivers in DU 422 are coupled to transceivers in CU 423 over mid-haul links. A transceiver in CU 423 is coupled to network core 450 over backhaul links.

RLC functions comprise ARQ, sequence numbering and resequencing, segmentation and resegmentation. MAC functions comprise buffer status, power control, channel quality, HARQ, user identification, random access, user scheduling, and QoS. PHY functions comprise packet formation/deformation, guard-insertion/guard-deletion, parsing/de-parsing, control insertion/removal, interleaving/de-interleaving, FEC encoding/decoding, channel coding/decoding, channel estimation/equalization, and rate matching/de-matching, scrambling/descrambling, modulation mapping/de-mapping, layer mapping/de-mapping, precoding, RE mapping/de-mapping, FFTs/IFFTs, and DFTs/IDFTs. PDCP functions include security ciphering, header compression and decompression, sequence numbering and re-sequencing, de-duplication. SDAP functions include QoS marking and flow control. RRC functions include authentication, security, handover control, status reporting, QoS, network broadcasts and pages, and network selection.

Figure 7:
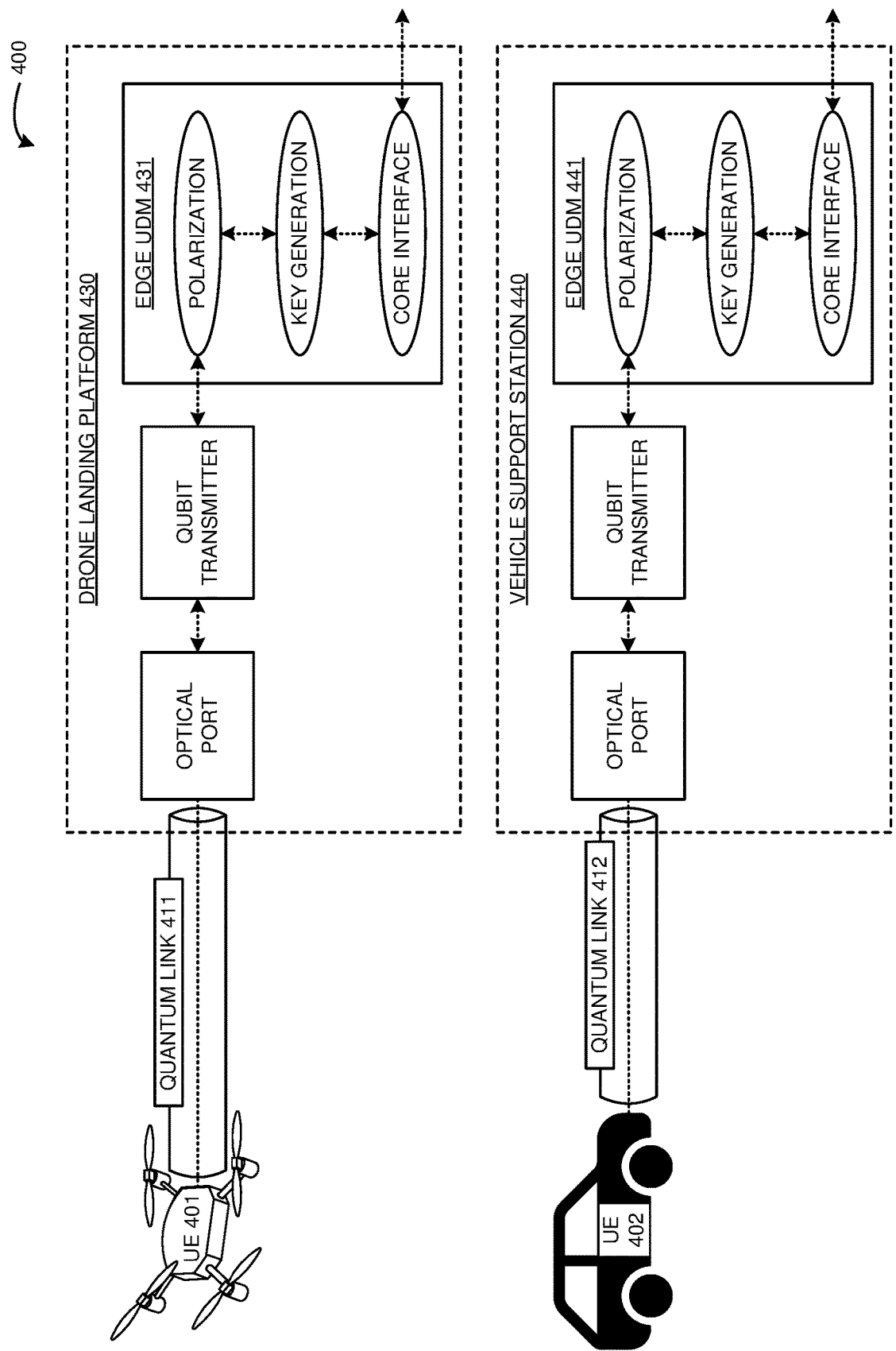
FIG. 7 illustrates quantum authentication interfaces in the 5G communication network.

FIG. 7 illustrates drone landing platform 430 and vehicle support station 440 in 5G communication network 400. Drone landing platform 430 and vehicle support station 440 comprise examples of network quantum circuitry 126, however network quantum circuitry 126 may differ. Drone landing platform 430 and vehicle support station 440 comprise optical ports, qubit transmitters, and edge UDMs 431 and 441. Edge UDMs 431 and 441 comprise network applications for polarization, key generation, and core interfacing. The core interfaces exchange authentication information and quantum derived keys for UEs 401-402 with UDM 455 over secure communications channels. The core interfaces may encrypt and transfer information using Fifth Generation Core (5GC) communication protocols to UDM 455 where UDM 455 decrypts the information upon receipt. The key generation applications generate quantum derived authentication keys for UEs 401-402 based on the polarization states of the qubits. The polarization applications select polarization bases for the qubit transmitters. The qubit transmitters generate and polarize the qubits using the indicated polarization bases from the polarization application. The optical ports couple to quantum links 411-412 and transfer the polarized qubits to UEs 401-402. In some examples, drone landing platform 430 and vehicle support station 440 host a Q-APP for UEs 401-402 to determine and indicate qubit polarizations for UEs 401-402.

Figure 8:
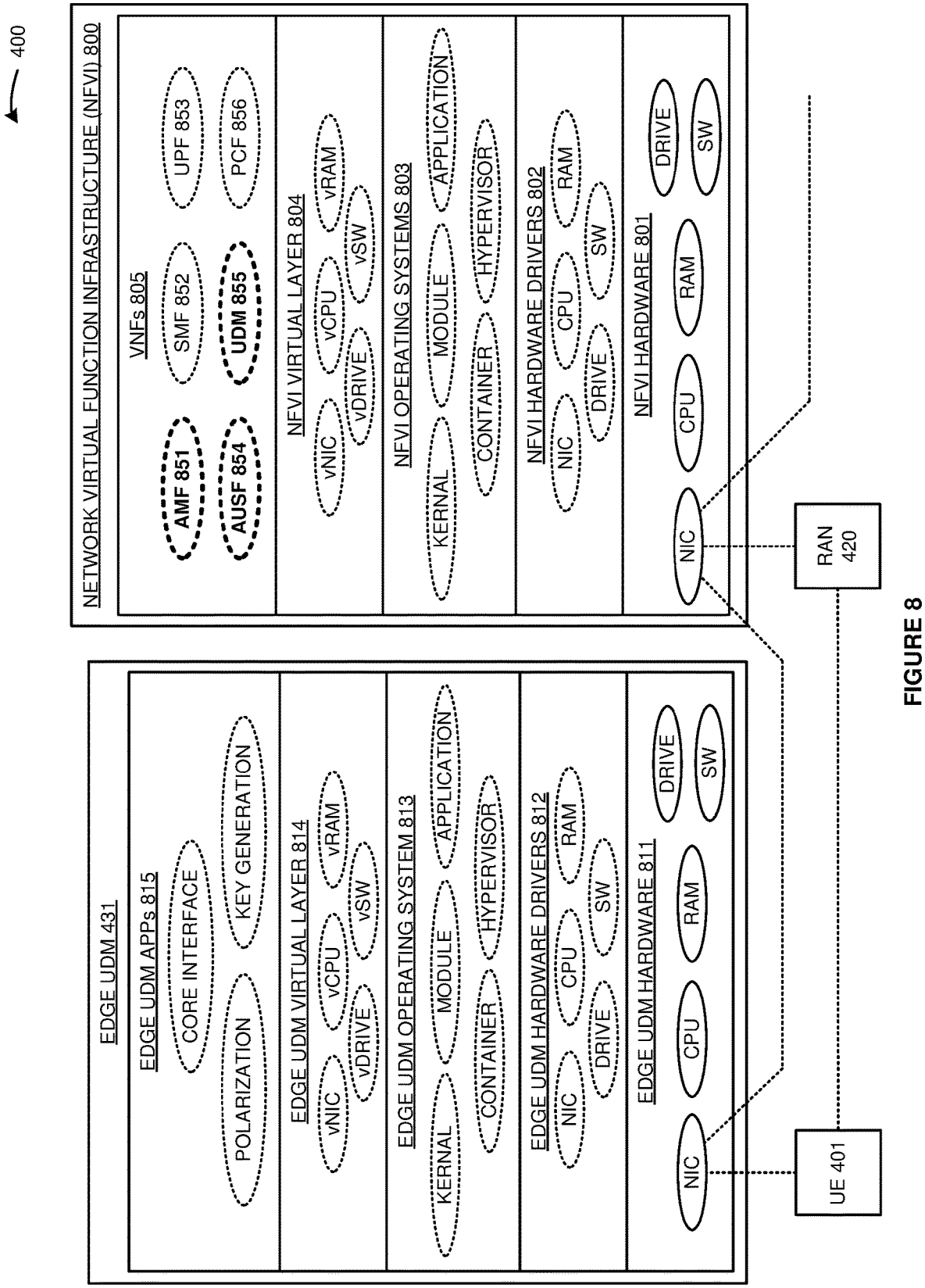
FIG. 8 illustrates Network Function Virtualization Infrastructure (NFVIs) in the 5G communication networks.

FIG. 8 illustrates Network Function Virtualization Infrastructure (NFVI) 800 and edge UDM 431 in 5G communication network 400. NFVI 800 comprises an example of network authentication circuitry 125, although network authentication circuitry 125 may vary from this example. Edge UDM 431 comprises an example of network quantum circuitry 126, although network quantum circuitry 126 may vary from this example. NFVI 800 comprises NFVI hardware 801, NFVI hardware drivers 802, NFVI operating systems 803, NFVI virtual layer 804, and NFVI Virtual Network Functions (VNFs) 805. NFVI hardware 801 comprises Network Interface Cards (NICs), CPU, RAM, Flash/Disk Drives (DRIVE), and Data Switches (SW). NFVI hardware drivers 802 comprise software that is resident in the NIC, CPU, RAM, DRIVE, and SW. NFVI operating systems 803 comprise kernels, modules, applications, containers, hypervisors, and the like. NFVI virtual layer 804 comprises vNIC, vCPU, vRAM, vDRIVE, and vSW. NFVI VNFs 805 comprise AMF 851, SMF 852, UPF 853, AUSF 854, UDM 855, and PCF 856. Additional VNFs and network elements like Network Slice Selection Function (NSSF), Unified Data Registry (UDR), and Network Exposure Function (NEF) are typically present but are omitted for clarity. NFVI 800 may be located at a single site or be distributed across multiple geographic locations. The NIC in NFVI hardware 801 is coupled to 5G RAN 420, to a NIC in edge UDM hardware 811, and to external systems. NFVI hardware 801 executes NFVI hardware drivers 802, NFVI operating systems 803, NFVI virtual layer 804, and NFVI VNFs 805 to form AMF 451, SMF 452, UPF 423, AUSF 454, UDM 455, and PCF 456.

Edge UDM 431 comprises edge UDM hardware 811, edge UDM hardware drivers 812, edge UDM operating systems 813, edge UDM virtual layer 814, and edge UDM applications (APPs) 815. Edge UDM 441 may comprise similar architecture to edge UDM 431, however edge UDM 441 may differ. Edge UDM hardware 811 comprises NICs, CPU, RAM, DRIVE, and SW. Edge UDM hardware drivers 812 comprise software that is resident in the NIC, CPU, RAM, DRIVE, and SW. Edge UDM operating systems 813 comprise kernels, modules, applications, containers, hypervisors, and the like. Edge UDM virtual layer 814 comprises vNIC, vCPU, vRAM, vDRIVE, and vSW. Edge UDM applications 815 comprise applications for core interfacing, polarization, and key generation. Edge UDM 431 may be located at a single site or be distributed across multiple geographic locations. The NIC in edge UDM hardware 811 is coupled to UE 401 and to a NIC in NFVI hardware 801. Edge UDM hardware 811 executes edge UDM hardware drivers 812, edge UDM operating systems 813, edge UDM virtual layer 814, and edge UDM applications 815 to form the core interfacing, polarization, and key generation applications.

Figure 9:
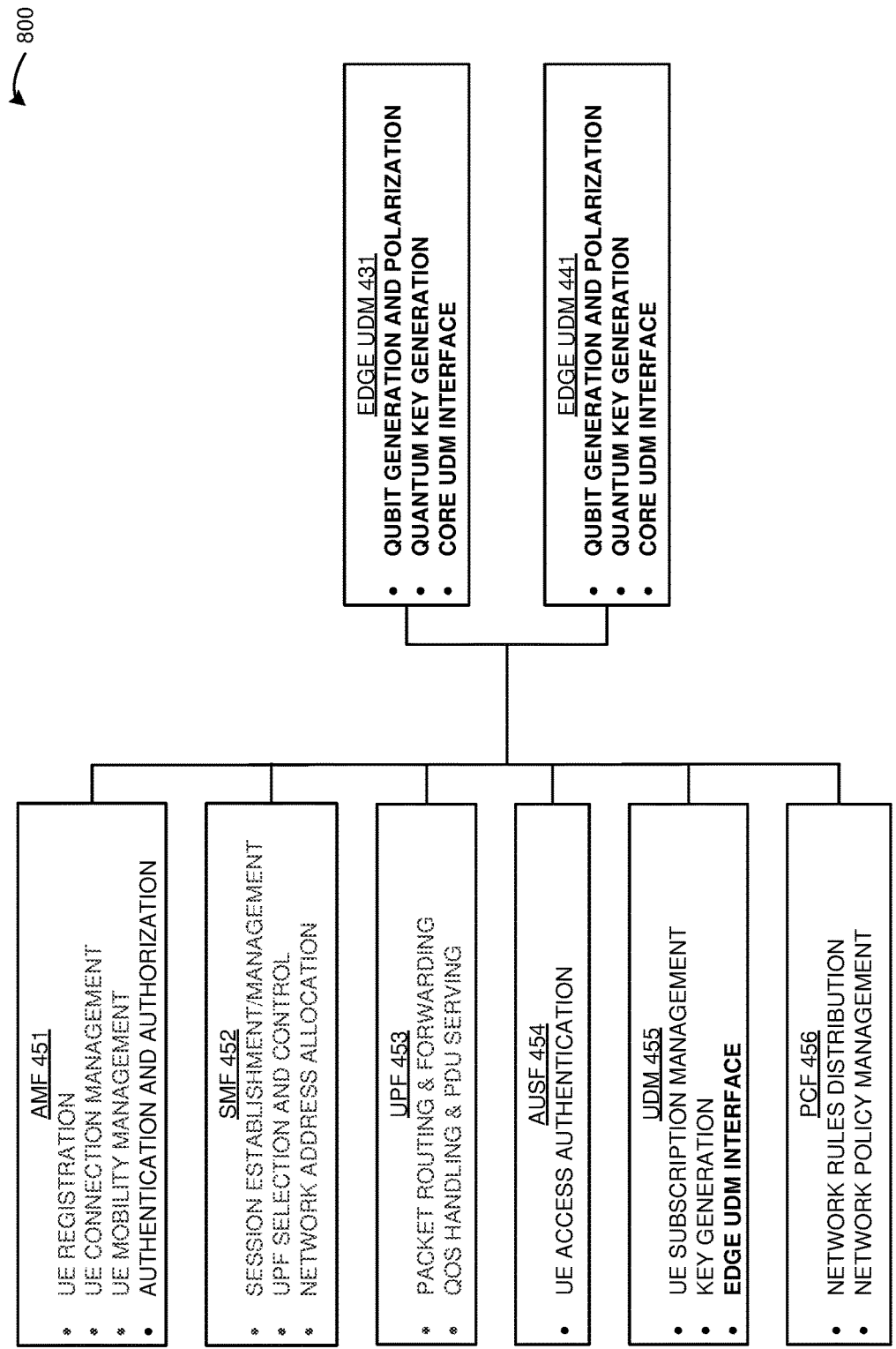
FIG. 9 further illustrates the NFVIs in the 5G communication networks.

FIG. 9 further illustrates NFVI 800, edge UDMs 431 and 441 in 5G communication network 400. AMF 451 performs UE registration and connection, UE connection/mobility management, and UE authentication and authorization. SMF 452 performs session establishment and management, UPF selection and control, and network address allocation, UPF 423 performs packet routing forwarding, QoS handling, and PDU interconnection and serving. AUSF performs UE access authentication. UDM 455 performs UE subscription management, key generation, and edge UDM interfacing. PCF 426 performs network policy management and network rules distribution. Edge UDMs 431 and 441 perform qubit generation and polarization, quantum generation and distribution, and network core UDM interfacing.

In this example, UE 401 lands on drone landing platform 401 and interacts with edge UDM 431 to generate a quantum authentication key, however the operation may differ in other examples. UE 401 lands on drone landing platform 430 and detachably couples to edge UDM 431 in drone landing platform 430 over quantum link 411. UE 401 establishes a secure wireless channel with drone landing platform 430 and responsively authenticates itself. In response to the authentication, edge UDM 431 initiates a QKD procedure with UE 401. Edge UDM 431 generates qubits for UE 401. Edge UDM 431 selects a polarization bases for the qubits and polarizes the qubits according to their selected polarization bases. For example, edge UDM 431 may horizontally polarize a first qubit and may vertically polarize a second qubit. Edge UDM 431 transfers the polarized qubits to UE 401 over quantum link 411.

UE 401 selects a measurement bases for the qubits received from edge UDM 431. UE 401 determines the polarizations of the received qubits using the corresponding measurement basis for the qubits. For example, UE 401 may determine the polarization of a first qubit using a rectilinear measurement basis and may determine the polarization of a second qubit using a diagonal measurement basis. The determined polarizations may differ based on the measurement basis used. UE 401 wirelessly indicates the determined polarizations of the received qubits to edge UDM 431 over drone landing platform 430. Edge UDM 431 wirelessly indicates the polarizations it selected to UE 401 over drone landing platform 430. Edge UDM 431 and UE 401 generate a quantum derived authentication key for UE 401 based on the determined polarizations and the selected polarizations for the qubits. UDM 431 encrypts its copy of the quantum derived key and transfers the quantum derived key to UDM 455 over a secure channel. UDM 455 decrypts and securely stores the quantum derived key for UE 401. For example, edge UDM 431 and UDM 455 may use 5GC encryption/decryption protocols to exchange the quantum derived key. UE 401 securely stores its copy of the quantum derived key.

Edge UDM 431 initiates another QKD procedure with UE 401. Edge UDM 431 generates additional qubits for UE 401. Edge UDM 431 selects a polarization basis for individual ones of the additional qubits and polarizes the additional qubits using their selected polarization bases. Edge UDM 431 transfers the additional polarized qubits to UE 401 over quantum link 411. UE 401 receives the additional qubits from edge UDM 431. UE 401 determines the polarizations of the additional qubits. UE 401 wirelessly indicates the determined polarizations of the additional qubits to edge UDM 431. Edge UDM 431 and UE 401 generate quantum communication keys for UE 401 based on the determined polarizations of the additional qubits. UDM 431 transfers the communication keys for UE 401 to UDM 455 over the secure channel. UE 401 detaches from quantum link 411. UE 401 takes off from drone landing platform 430 and flies to another location.

AMF 451 receives a registration request for UE 401 from RAN 420. AMF 451 transfers an identity request in NAS signaling to UE 401 over RAN 420. AMF 451 receives NAS signaling from UE 401 that indicates the identity for UE 401. AMF 451 processes the identity and responsively selects AUSF 454 to authenticate UE 401 for wireless services. AMF 451 transfers an authentication request that indicates the identity of UE 401 to AUSF 454. AUSF 454 receives the authentication request and selects UDM 455 to authenticate UE 401. AUSF 454 requests authentication keys for UE 401 from UDM 455. UDM 455 transfers authentication data and the quantum derived authentication key for UE 401 to AUSF 454. AUSF 454 uses the quantum derived authentication key and a random number to generate an expected result for UE 401 to authenticate itself. AUSF 454 transfers the expected result and the random number to AMF 451. AMF 451 transfers NAS signaling that indicates the random number to UE 401 over RAN 420. AMF 451 receives NAS signaling that indicates the expected result from UE 401 over RAN 420. AMF 451 matches the expected result from AUSF 454 with the expected result from UE 401 to authenticate the identity of UE 401.

Responsive to the authentication and authorization, AMF 451 retrieves UE context for UE 401 from UDM 455. AMF 451 retrieves service policies for UE 401 from PCF 456. AMF 451 selects SMF 452 to establish a PDU session for UE 401 based on the UE context and the service policies. SMF 452 selects UPF 453 to establish the PDU session for UE 401. SMF 452 transfers session context for the PDU session to AMF 451. AMF 451 encrypts the session context using the quantum derived communication key for UE 401 and transfers the session context to UE 401 over RAN 420. UE 401 uses its quantum derived communication key to decrypt the session context. UPF 453 exchanges user data with UE 401 over RAN 420. UPF 453 and UE 401 encrypt/decrypt the user data using the quantum derived communication keys.

Figure 10:
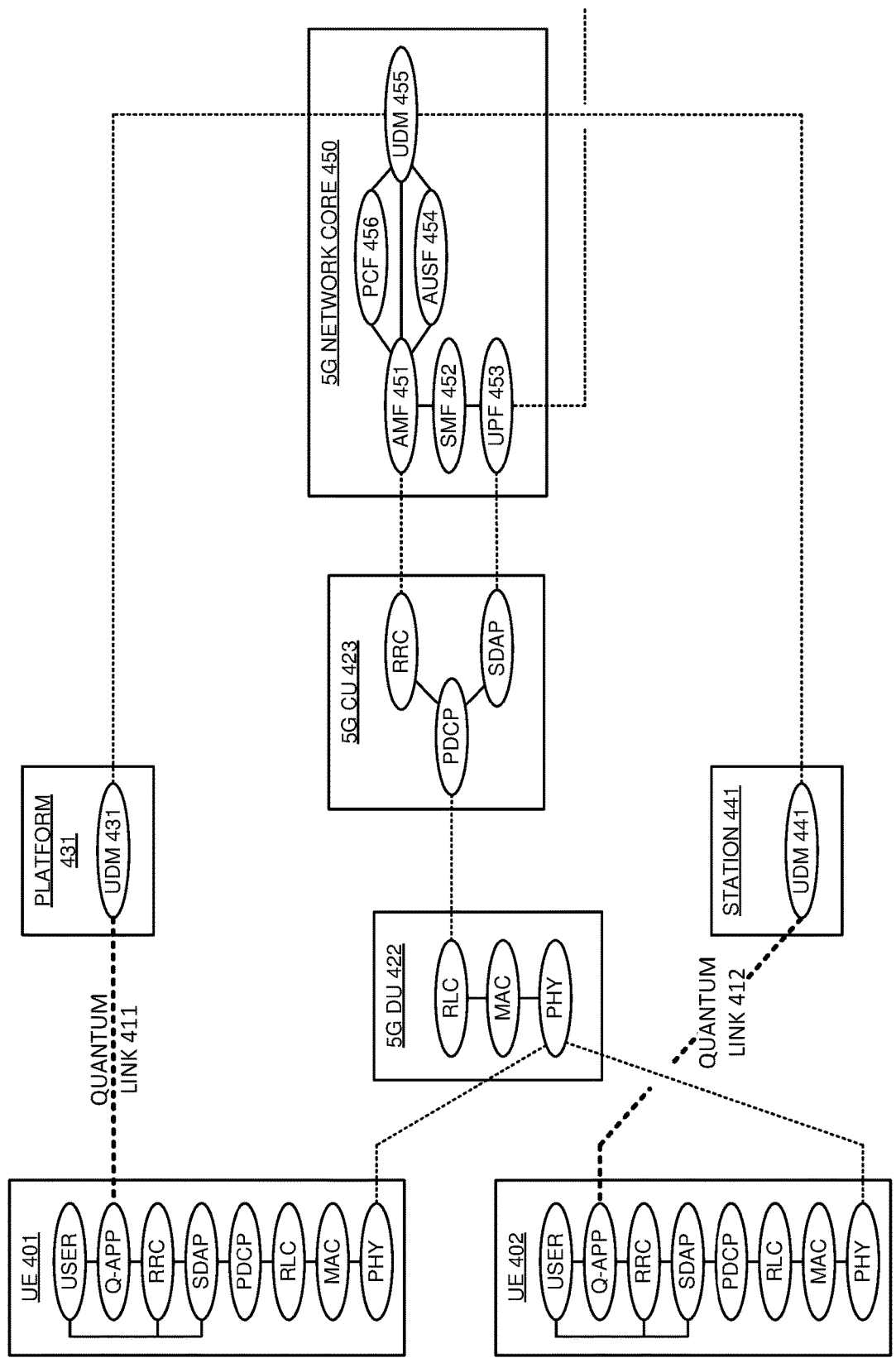
FIG. 10 illustrates an exemplary operation of the 5G communication network to perform quantum authentication for the quantum capable 5G UEs.

FIG. 10 illustrates an exemplary operation of 5G communication network 400 to perform quantum authentication for quantum capable 5G UE 402. The operation may vary in other examples. In this example, UE 402 drives to vehicle support station 440 and interacts with edge UDM 441 to generate a quantum authentication key, however operation may differ in other examples.

UE 402 drives to vehicle support station 440 and couples to edge UDM 441 over quantum link 412. The Q-APP in UE 402 establishes a secure wireless channel with vehicle support station 440 and authenticates with vehicle support station 440. In response to the authentication, edge UDM 441 initiates a QKD procedure with UE 402. Edge UDM 441 generates entangled pairs of qubits for UE 402. Edge UDM 441 polarizes the entangled pairs of qubits according to the selected polarization basis for individual pairs of the qubits. Edge UDM 441 transfers a polarized qubit from each entangle pair to UE 402 over quantum link 412. UE 402 receives the qubits from edge UDM 441. The Q-APP in UE 402 selects a measurement basis for each of the individual qubits received from edge UDM 441. The Q-APP in UE 402 determines the polarizations of the received qubits using the selected measurement bases for each of the received qubits. The Q-APP in UE 402 wirelessly indicates the determined polarizations of the received qubits to edge UDM 441. Edge UDM 441 wirelessly indicates the polarizations it selected for each of the transferred qubits to the Q-APP in UE 402. Edge UDM 441 and the Q-APP in UE 402 generate an authentication key for UE 402 based on the determined polarizations and selected polarizations of the qubits. UDM 441 encrypts and transfers the quantum authentication key to UDM 455. UDM 455 receives and decrypts the quantum authentication key for UE 402.

Edge UDM 441 initiates another QKD procedure with UE 402. Edge UDM 441 generates additional qubits for UE 402. Edge UDM 441 selects a polarization basis for individual ones of the additional qubits and polarizes the additional qubits using their selected polarization bases. Edge UDM 441 transfers the additional polarized qubits to UE 402 over quantum link 412. UE 402 receives the additional qubits from edge UDM 441. UE 402 determines the polarizations of the additional qubits. UE 402 wirelessly indicates the determined polarizations of the additional qubits to edge UDM 441. Edge UDM 441 and UE 402 generate quantum communication keys for UE 402 based on the determined polarizations of the additional qubits. Edge UDM 441 transfers the communication keys for UE 402 to UDM 455 over the secure channel. UE 402 detaches from quantum link 412. UE 402 drives to another location.

At the other location, a user application in UE 402 executes. In response, the RRC in UE 402 wirelessly attaches to the RRC in CU 423 and transfers attachment signaling to the RRC in CU 423 over the PDCPs, RLCs, MACs, and PHYs. The RRC in CU 423 establishes a Radio Resource Control (RRC) connection with the RRC in UE 402 over the PDCPs, RLCs, MACs, and PHYs. The RRC in CU 423 transfers a registration request for UE 402 to AMF 451. AMF 451 transfers NAS signaling that indicates an identity request for UE 402 to the RRC in CU 423. The RRC in CU 423 forwards the NAS signaling to the RRC in UE 402 over the PDCPs, RLCs, MACs, and PHYs. In response, the RRC in UE 402 transfers NAS signaling that indicates its identity to the RRC in CU 423 over the PDCPs, RLCs, MACs, and PHYs. The RRC in CU 423 forwards the NAS signaling to AMF 451. AMF 451 identifies UE 402 and selects AUSF 454 to authenticate UE 402. AMF 451 transfers an authentication request for UE 402 to AUSF 454.

AUSF 454 selects UDM 455 to authenticate UE 402. AUSF 454 retrieves the quantum authentication key for UE 402 from UDM 455. AUSF 454 generates an expected result for UE 402 using the quantum authentication key and a random number. AUSF 454 transfers the expected result and the random number to AMF 451. AMF 451 stores the expected result from AUSF 451 and transfers NAS signaling that indicates the random number to the RRC in CU 423. The RRC in CU 423 forwards the NAS signaling to the RRC in UE 402 over the PDCPs, RLCs, MACs, and PHYs. The RRC in UE 402 transfers the random number to the Q-APP.

The Q-APP hashes the quantum authentication key and the random number to generate an expected response. The Q-APP transfers the expected response to the RRC. The RRC in UE 402 transfers NAS signaling that indicates the expected response to the RRC in CU 423 over the PDCPs, RLCs, MACs, and PHYs. The RRC in CU 423 forwards the NAS signaling to AMF 451. AMF 451 processes the NAS signaling and identifies expected response. AMF 451 responsively matches the expected response from UE 402 with expected response from AUSF 454 to authenticate the identity of UE 402.

Responsive to the authentication and authorization, AMF 451 retrieves UE context for UE 402 from UDM 455 and retrieves service policies for UE 402 from PCF 456. AMF 451 selects SMF 452 to establish a PDU session for UE 402 based on the UE context and the service policies. SMF 452 selects UPF 453 to establish the PDU session for UE 402 based on the UE context. SMF 452 transfers session context for the PDU session to AMF 451. AMF 451 encrypts the session context using the quantum communication key and transfers the session context to the RRC in CU 423. The RRC in CU 423 forwards the encrypted session context to the RRC in UE 402 over the PDCPs, RLCs, MACs, and PHYs. The RRC in UE 402 transfers the session context to the Q-APP. The Q-APP decrypts the session context with the quantum communication key and transfers the decrypted session context to the RRC. The RRC in UE 402 directs the SDAP to use the context to initiate the PDU session. The SDAP in UE 402 exchanges user data with the SDAP in CU 423 over the PDCPs, RLCs, MACs, and PHYs. The SDAP in CU 423 exchanges user data with UPF 453. UPF 453 exchanges the user data with external systems.

The wireless data network circuitry described above comprises computer hardware and software that form special-purpose network circuitry to perform quantum authentication for quantum capable 5G UEs. The computer hardware comprises processing circuitry like CPUs, DSPs, GPUs, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose network circuitry to perform quantum authentication for quantum capable 5G UEs.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method of operating a wireless User Equipment (UE) to perform quantum authentication with a wireless communication network, the method comprising:
   quantum circuitry receiving qubits that were generated by the wireless communication network;
   the quantum circuitry determining polarization states for the qubits;
   the quantum circuitry exchanging cryptography information with the wireless communication network;
   the quantum circuitry generating cryptography keys based on the polarization states and the cryptography information, wherein the wireless communication network generates the cryptography keys based on the polarization states and the cryptography information;
   the quantum circuitry transferring the cryptography keys to network circuitry; and
   the network circuitry receiving the cryptography keys from the quantum circuitry, generating authentication data based the cryptography keys, and wirelessly transferring the authentication data to the wireless communication network, wherein the wireless communication network authenticates the wireless UE based on the authentication data and the cryptography keys.

2. The method of claim 1 wherein the wireless UE comprises a vehicle.

3. The method of claim 1 wherein the wireless UE comprises an aerial drone.

4. The method of claim 1 wherein the wireless UE comprises a robot.

5. The method of claim 1 wherein the quantum circuitry receiving the qubits from the wireless communication network comprises receiving the qubits over an optical interface.

6. The method of claim 1 wherein the quantum circuitry receiving the qubits from the wireless communication network comprises receiving the qubits over an optical interface in an aerial drone landing platform.

7. The method of claim 1 wherein the quantum circuitry receiving the qubits from the wireless communication network comprises receiving the qubits over an optical interface in a vehicle support station.

8. The method of claim 1 wherein the quantum circuitry receiving the qubits from the wireless communication network comprises receiving the qubits from a Unified Data Management (UDM) over an optical interface in an aerial drone landing platform.

9. The method of claim 1 wherein the quantum circuitry receiving the qubits from the wireless communication network comprises receiving the qubits from a Unified Data Management (UDM) over an optical interface in a vehicle support station.

10. The method of claim 1 wherein:
    the quantum circuitry receiving the qubits, determining the polarization states, exchanging the cryptography information, and generating the cryptography keys comprises receiving the qubits, determining the polarization states, exchanging the cryptography information, and generating the cryptography keys at a first geolocation; and
    the network circuitry generating and wirelessly transferring the authentication data comprises generating and wirelessly transferring the authentication data at a second geolocation that is different from the first geolocation.

11. A wireless User Equipment (UE) to perform quantum authentication with a wireless communication network, the wireless UE comprising:
    quantum circuitry configured to receive qubits that were generated by the wireless communication network;
    the quantum circuitry configured to determine polarization states for the qubits;
    the quantum circuitry configured to exchange cryptography information with the wireless communication network;
    the quantum circuitry configured to generate cryptography keys based on the polarization states and the cryptography information, wherein the wireless communication network is configured to generate the cryptography keys based on the polarization states and the cryptography information;
    the quantum circuitry configured to transfer the cryptography keys to network circuitry; and
    the network circuitry configured to receive the cryptography keys from the quantum circuitry, generate authentication data based the cryptography keys, and wirelessly transfer the authentication data to the wireless communication network, wherein the wireless communication network is configured to authenticate the wireless UE based on the authentication data and the cryptography keys.

12. The wireless UE of claim 11 wherein the wireless UE comprises a vehicle.

13. The wireless UE of claim 11 wherein the wireless UE comprises an aerial drone.

14. The wireless UE of claim 11 wherein the wireless UE comprises a robot.

15. The wireless UE of claim 11 wherein the quantum circuitry is configured to receive the qubits over an optical interface to receive the qubits from the wireless communication network.

16. The wireless UE of claim 11 wherein the quantum circuitry is configured to receive the qubits over an optical interface in an aerial drone landing platform to receive the qubits from the wireless communication network.

17. The wireless UE of claim 11 wherein the quantum circuitry is configured to receive the qubits over an optical interface in a vehicle support station to receive the qubits from the wireless communication network.

18. The wireless UE of claim 11 wherein the quantum circuitry is configured to receive the qubits from a Unified Data Management (UDM) over an optical interface in an aerial drone landing platform to receive the qubits from the wireless communication network.

19. The wireless UE of claim 11 wherein the quantum circuitry is configured to receive the qubits from a Unified Data Management (UDM) over an optical interface in a vehicle support station to receive the qubits from the wireless communication network.

20. The wireless UE of claim 11 wherein:
the quantum circuitry is configured to receive the qubits, determine the polarization states, exchange the cryptography information, and generate the cryptography keys at a first geolocation; and
the network circuitry is configured to generate and wirelessly transfer the authentication data at a second geolocation that is different from the first geolocation.

* * * * *